United States Patent
Kinugasa

(10) Patent No.: US 11,307,057 B2
(45) Date of Patent: *Apr. 19, 2022

(54) ENCODER ABNORMALITY DETECTION METHOD

(71) Applicant: Panasonic Intellectual Property Management Co., Ltd., Osaka (JP)

(72) Inventor: Yasuhiro Kinugasa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 220 days.

This patent is subject to a terminal disclaimer.

(21) Appl. No.: 16/780,875

(22) Filed: Feb. 3, 2020

(65) Prior Publication Data
US 2020/0173814 A1    Jun. 4, 2020

Related U.S. Application Data

(63) Continuation of application No. PCT/JP2018/027584, filed on Jul. 24, 2018.

(30) Foreign Application Priority Data

Aug. 8, 2017    (JP) .............................. JP2017-153529

(51) Int. Cl.
*H02P 29/024*    (2016.01)
*G01D 5/244*    (2006.01)
(Continued)

(52) U.S. Cl.
CPC .......... *G01D 5/24466* (2013.01); *B25J 15/02* (2013.01); *G05B 9/02* (2013.01); *H02P 29/024* (2013.01)

(58) Field of Classification Search
CPC ....... G01D 5/24466; B25J 15/02; G05B 9/02; H02P 29/024
See application file for complete search history.

(56) References Cited

U.S. PATENT DOCUMENTS 5,809,391 A * 9/1998 Fujita ..................... G03G 15/70
399/18
6,091,219 A * 7/2000 Maruo ................... G05B 19/31
318/562

(Continued)

FOREIGN PATENT DOCUMENTS

JP    2001-202134    7/2001
JP    2005-186183    7/2005

(Continued)

OTHER PUBLICATIONS

International Search Report of PCT application No. PCT/JP2018/027584 dated Oct. 16, 2018.

*Primary Examiner* — Rina I Duda
(74) *Attorney, Agent, or Firm* — Wenderoth, Lind & Ponack, L.L.P.

(57) ABSTRACT

In a robot including a motor and an encoder for detecting the rotational position of the motor, the controller outputs a speed command indicating the rotational position of the motor and sends commanded-position information indicating the rotational position of the motor according to the speed command to a safety unit for detecting a fault in the encoder. When the controller is holding modified point-of-origin information of the motor and the safety unit is holding the original point-of-origin information, the controller sends commanded-position information generated based on the original point-of-origin information to the safety unit.

7 Claims, 10 Drawing Sheets

(51) Int. Cl.
  *B25J 15/02* (2006.01)
  *G05B 9/02* (2006.01)

(56) References Cited

U.S. PATENT DOCUMENTS

| | | | | |
|---|---|---|---|---|
| 7,293,761 | B2* | 11/2007 | Malek | B66C 15/065 |
| | | | | 254/275 |
| 9,007,056 | B2* | 4/2015 | Okamoto | G01D 5/2451 |
| | | | | 324/207.25 |
| 2005/0098768 | A1* | 5/2005 | Malek | B66C 15/065 |
| | | | | 254/267 |
| 2010/0295497 | A1* | 11/2010 | Takamatsu | H02P 23/18 |
| | | | | 318/671 |
| 2011/0202308 | A1 | 8/2011 | Kishida et al. | |
| 2011/0221377 | A1* | 9/2011 | Ueno | G05B 19/18 |
| | | | | 318/565 |
| 2013/0193894 | A1* | 8/2013 | Kiguchi | H02P 3/00 |
| | | | | 318/490 |
| 2015/0142377 | A1 | 5/2015 | Kishida et al. | |
| 2020/0047344 | A1* | 2/2020 | Kinugasa | B25J 9/1694 |
| 2020/0173814 | A1* | 6/2020 | Kinugasa | G01D 3/08 |
| 2021/0060784 | A1* | 3/2021 | Kinugasa | B25J 13/088 |

FOREIGN PATENT DOCUMENTS

| | | |
|---|---|---|
| JP | 2007-265103 | 10/2007 |
| JP | 2013-144325 | 7/2013 |
| JP | 5367623 B | 12/2013 |
| JP | 5675761 B | 2/2015 |

\* cited by examiner

|  | | pattern | |
|---|---|---|---|
|  | | A | B |
| point-of-origin information | information held by the controller | original value | modified |
|  | information held by the safety unit | original value | non-modified |
|  | basic information of commanded-position information | original value | non-modified |

FIG. 4C

|  |  | pattern | |
|---|---|---|---|
|  |  | A | B |
| point-of-origin information | information held by the controller | original value | modified |
| | information held by the safety unit | original value | non-modified |
| | basic information of commanded-position information | original value | modified |

ENCODER ABNORMALITY DETECTION METHOD

This application is a continuation of the PCT International Application No. PCT/JP2018/027584 filed on Jul. 24, 2018, which claims the benefit of foreign priority of Japanese patent application No. 2017-153529 filed on Aug. 8, 2017, the contents all of which are incorporated herein by reference.

TECHNICAL FIELD

The present disclosure relates to a method for detecting a fault in an encoder.

BACKGROUND ART

In the field of encoders used to detect the rotational position of a motor for driving the output shaft of an operating device such as a robot, there has been a technique of detecting a fault such as a failure in the encoders.

Patent Literature 1 discloses an encoder system that includes a first encoder for detecting the rotation of the input shaft of the motor, and a second encoder for detecting the rotation of the output shaft of the motor. Patent Literature 1 further discloses a technique of determining that either of the two encoders is faulty when the position measurement values detected by these encoders have a difference of not less than a given value.

Patent Literature 2 discloses s servo system including a safety unit for monitoring the proper control of the motor. According to the servo system, the safety unit receives a command value and a feedback value from the servo driver, which controls the motor. When there is a fault in these values, the safety unit generates a stop signal to be sent to the servo driver.

CITATION LIST

Patent Literature

PTL 1: Japanese Patent No. 5675761
PTL 2: Japanese Patent No. 5367623

SUMMARY

Technical Problem

However, many of the drive systems (motors) of general-purpose operating devices include a single encoder. Therefore, the technique of Patent Literature 1 cannot be applied to these general-purpose motors. Moreover, if the system according to Patent Literature 1 is newly produced, the system requires a plurality of sensors, which increases the cost.

Similarly, if the technique of Patent Literature 2 is applied to a general-purpose system not including a fault detection function, the servo driver requires a new function. As a result, it is necessary to develop both the servo driver and the safety unit. This increases man-hours.

FIG. 14 is a block diagram of the structure of the robot control unit according to the related art disclosed in Patent Literature 2. In the robot control shown in FIG. 14, controller 7 sends a command signal to servo driver 10. Servo driver 10 generates a current value for driving motor 4 based on the command signal from controller 7 and the detection signal from encoder 5, and then controls motor 4 based on the current value.

Servo driver 10 further generates a command value (motor command value), which is used for comparison and concerns the rotational position of motor 4 based on the command signal from controller 7, and then sends the generated command value to safety unit 9. Servo driver 10 further generates a value indicating the rotational position of motor 4 (motor detection value) based on the following information: the output signal from encoder 5; the reduction gear ratios of the shafts of motor 4; the point-of-origin information of motor 4; and other information. Servo driver 10 then sends the generated value to safety unit 9. Safety unit 9 compares the motor command value and the motor detection value both from servo driver 10, and determines the presence or absence of a fault in encoder 5 based on the comparison result.

Assume that the structure shown in FIG. 14 is applied to a general-purpose robot not including a fault detection unit for detecting a fault in encoder 5. The servo driver 10 of such a robot does not usually have the function of generating the motor command value and the motor detection value, or the function of outputting the generated motor command value and motor detection value.

This makes it necessary to provide the general-purpose robot with a newly designed circuit or program having the above-mentioned generation function and output function. The robot further needs a mechanism (e.g., a circuit, a program, a display) indicating whether the newly designed circuit or program is working properly. This requires more time and complicated processes.

In the case of detecting the positioning precision of the robot "A" or replacing motor 4, controller 7 may adjust the correspondence between the present encoder detection signal and the degree of the output shaft of motor 4. In this adjustment, the operator of the robot "A" modifies the point-of-origin information of motor 4 (hereinafter, simply "point-of-origin information") held by controller 7. During the adjustment, controller 7 places robot "A" in the stopped state.

On the other hand, to ensure functional safety, controller 7 and safety unit 9 operate independent of each other. Therefore, even if the point-of-origin information held by controller 7 is modified, this modification does not affect the point-of-origin information held by safety unit 9. This may cause the safety unit to fail to correctly detect the presence or absence of a fault in the encoder.

To solve this problem, an objective of the present disclosure is to provide a method for detecting a fault in the encoder, making the safety unit less likely to cause fault misdetection even when the point-of-origin information held by the controller is modified.

Solution to Problem

To achieve the above objective, the method for detecting a fault in the encoder of the present disclosure has the following features. Assume that the point-of-origin information of the motor is modified and the controller is holding the modified point-of-origin information, but the safety unit is holding the original point-of-origin information. In this case, the safety unit is provided with commanded-position information that has been generated based on the original point-of-origin information, so as to prevent the safety unit from causing fault misdetection in the encoder. Furthermore, when there is a difference of not less than a predetermined value between the detected-position information calculated based on the output signal from the encoder and the commanded-position information from the controller, the encoder is determined to be faulty.

More specifically, the method for detecting a fault in the encoder according to the present disclosure is a method for detecting a fault in an encoder, the encoder being configured to detect the rotational position of a motor, the motor being configured to drive the output shaft of an operating device, the operating device including:

a fault detection unit configured to detect the fault in the encoder;

a controller configured
to output a speed command indicating the rotational position of the motor and
to send to the fault detection unit commanded-position information indicating the rotational position of the motor according to the speed command; and a driver configured
to receive the speed command from the controller and an output signal from the encoder and
to control driving of the motor based on the speed command and the output signal.

The method includes the following steps:

an information transmission step of causing the controller to send the fault detection unit the commanded-position information when the controller is holding modified point-of-origin information of the motor and the fault detection unit is holding original point-of-origin information, the commanded-position information being generated based on the original point-of-origin information;

an information acquisition step of causing the fault detection unit to receive the commanded-position information from the controller and the output signal from the encoder; and a fault determination step of causing the fault detection unit
to compare the commanded-position information and detected-position information of the motor calculated based on the output signal and
to determine that the encoder is faulty when there is a difference of not less than a predetermined value between the commanded-position information and the output signal.

According to this method, the fault detection unit determines the presence or absence of a fault in the encoder based on the comparison result between the commanded-position information from the controller and the detected-position information calculated based on the output signal from the encoder. This achieves fault detection in the encoder without providing the driver with an additional structure or function for the fault detection in the encoder. In other words, fault detection in the encoder can be performed while minimizing the influence on, for example, the existing structure or circuit of a general operating device (e.g., robot or external shafts). If the point-of-origin information is modified, the controller sends to the fault detection unit the commanded-position information based on the original point-of-origin information. This equalizes the point-of-origin information from the controller and the original point-of-origin information held by the fault detection unit. As a result, the fault detection unit is prevented from causing fault misdetection.

In the fault determination step, the fault detection unit compensates the commanded-position information, which is received from the controller, for the time delay due to the delay in the drive control of the motor. It is preferable for the fault detection unit to determine the presence or absence of the fault in the encoder based on the comparison result between the detected-position information and the commanded-position information compensated for the time delay.

Thus, delaying the commanded-position information used for the fault determination of the encoder can eliminate the time lag due to the delay in the motor drive control, thereby improving the accuracy in the fault detection of the encoder.

In the fault determination step, the fault detection unit generates the integrated value of the amount of change of the commanded-position information sent from the controller. It is preferable for the fault detection unit to determine the presence or absence of the fault in the encoder based on the comparison result between the detected-position information and the sum of the commanded-position information and the integrated value.

Thus, adding the integrated value to the commanded-position information used for the fault determination of the encoder increases the margin in the fault determination. This prevents the fault detection unit from erroneously determining that the encoder is faulty in spite that the encoder is operating properly.

In the fault determination step, it is preferable for the fault detection unit to determine the presence or absence of the fault in the encoder based on the comparison result between the detected-position information and the value obtained by adding a predetermined threshold to the sum of the integrated value and the commanded-position information.

According to this method, the threshold is added to the sum of the integrated value and the commanded-position information, and the resulting value is compared with the detected-position information. As a result, even if the operating device that is not operating causes an unintended operation when there is no change in the commanded-position information for a certain period of time, the fault detection unit can detect a fault in the encoder.

The operating device further includes a safety circuit for emergency-stopping the operating device. The controller is configured to send the safety circuit an emergency stop signal in case of an emergency. In the fault determination step, it is preferable that when detecting the emergency stop signal sent from the controller, the fault detection unit does not determine that the encoder is faulty even if the difference between the commanded-position information and the output signal is not less than the predetermined value.

According to this method, even when there is a difference of less than the predetermined value between the commanded-position information and the detected-position information after the controller outputs the emergency stop signal, the encoder is not determined to be faulty. For example, when the controller outputs an emergency stop signal and then stops outputting the speed command and the commanded-position information, the encoder can be prevented from being determined to be faulty in spite of operating properly.

Advantageous Effects of Invention

As described above, the method for detecting a fault in an encoder of the present disclosure can make the fault detection unit less likely to cause fault misdetection in the encoder.

BRIEF DESCRIPTION OF DRAWINGS

FIG. 4C shows the correspondence between the control patterns and the point-of-origin information according to the related art.

DESCRIPTION OF EMBODIMENTS

The exemplary embodiments will be described in detail as follows with reference to the drawings. Note that these embodiments are examples of the present disclosure, and do not intend to limit the disclosure, its application or use.

First Exemplary Embodiment

The Structure of the Robot and its Control System

Figure 1:
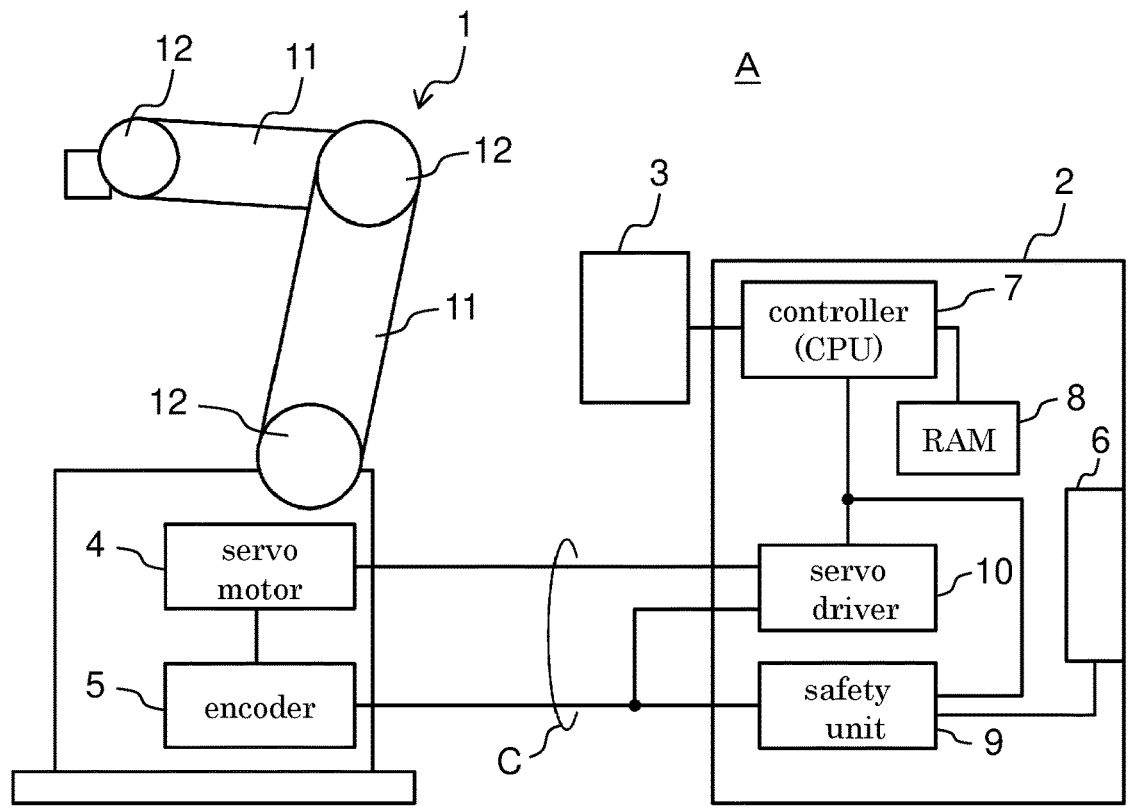
FIG. 1 is a schematic configuration view of the robot control system.
Figure 2:
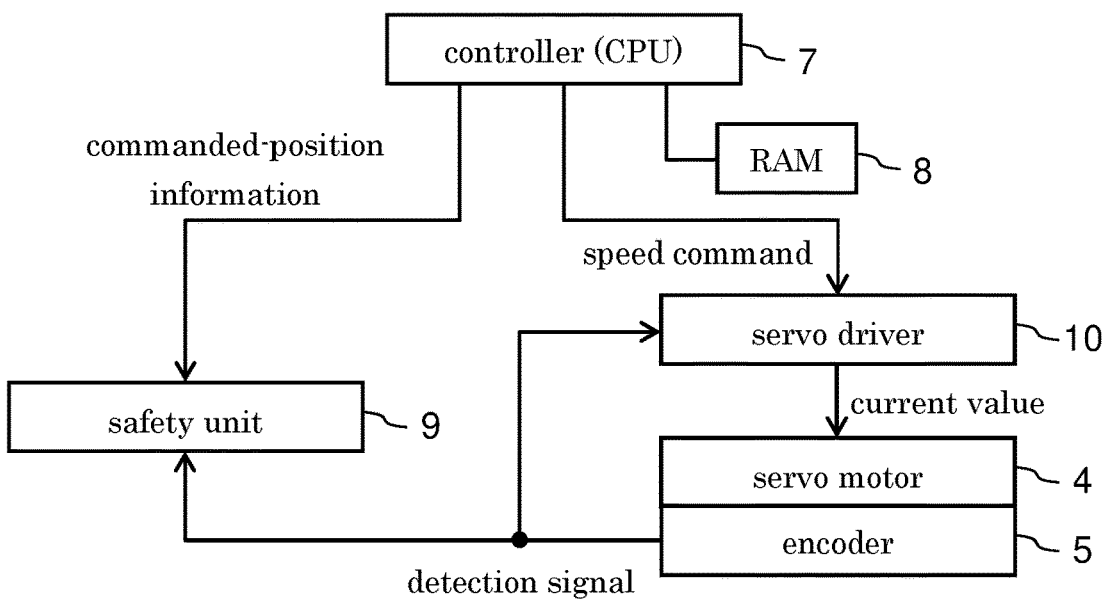
FIG. 2 is a block diagram of a structure of the robot control unit according to the first exemplary embodiment.

FIG. 1 is a schematic configuration view of a robot control system, which is the operating device of the present exemplary embodiment. FIG. 2 is a block diagram of a structure of robot control unit 2 in the robot control system illustrated with arrows indicating the direction of transmission of information and signals.

As shown in FIG. 1, the robot "A" includes robot mechanism unit 1, robot control unit 2, and operation unit 3 equipped with a display. Units 1 and 2 are connected to each other through connection cable C. Although the information is transmitted through connection cable C in FIG. 1, it may alternatively be transmitted wirelessly. This holds true between the blocks.

Robot mechanism unit 1 includes a plurality of robot arms 11 and a plurality of joint shafts 12. Each robot arm 11 is driven by servo motor 4 (hereinafter, motor 4) equipped to it. When, for example, the robot "A" is a six-axis vertical articulated robot, the robot "A" includes six robot arms 11 and six motors 4 corresponding to arms 11. Each motor 4 is equipped with encoder 5 for detecting the rotational position of motor 4 or the amount of rotation of motor 4 based on the rotational position.

Although not illustrated in FIG. 1, the robot "A" includes external shafts driven based on the drive control exerted by robot control unit 2 on robot mechanism unit 1. The external shafts are used in combination with robot mechanism unit 1 so as to expand the range of motion of the robot "A". Each external shaft is driven by motor 4 equipped with it. Each motor 4 is equipped with encoder 5 for detecting the rotational position of motor 4 or the amount of rotation based on the rotational position. Thus, each of joint shafts 12 and the external shafts is equipped with motor 4, which is equipped with encoder 5. The type of the external shafts is not particularly limited; for example, slider type, positioner type and other types are applicable to the present exemplary embodiment.

In the present exemplary embodiment, for easier understanding of the invention, motors 4 and encoders 5 used in joint shafts 12 and their equivalents used in the external shafts are not distinguished from each other in the drawings (e.g., FIG. 1) and the description. Therefore, motors 4 and encoders 5 referred to in the following description indicate both those used in joint shafts 12 and those used in the external shafts. In other words, the fault detection unit and the method for detecting a fault in encoders 5 described below are applicable to both encoders 5 attached to motors 4 in joint shafts 12 and encoders 5 attached to motors 4 in the external shafts.

Each encoder 5 is connected to safety unit 9, which will be described later, and servo driver 10, and sends (feeds back) the detected signal to safety unit 9 and servo driver 10.

Operation unit 3 includes an input unit (not shown) for receiving input from the operator of the robot "A" and a display (not shown). Operation unit 3 performs communications with robot control unit 2 based on the input from the user. This enables the operator to set or control the movement of robot arms 11 through operation unit 3. Note that the input unit may be a touch panel, and that the display may be integrated with the input unit.

Robot control unit 2 includes controller (e.g., CPU) 7, random access memory (RAM) 8 as a storage, safety unit 9 as a fault detection unit, servo driver 10, and safety circuit (controller) 6. Servo driver 10 drives each motor 4. Safety circuit (controller) 6 stops the driving power supply (not shown) of the robot "A" upon receiving an emergency stop signal from safety unit 9. In the present disclosure, the robot control system includes encoders 5 and robot control unit 2.

RAM 8 stores information, such as the teaching program, the functional setting and the point-of-origin information of the robot "A", which are generated by the operator using operation unit 3.

Controller 7 calculates the speed command (the distance traveled per unit time) based on the above-mentioned teaching program, the functional setting, the point-of-origin information and other information stored in RAM 8. Controller 7 then sends the calculated speed command to servo driver 10 so as to perform the operation command of the robot "A". Furthermore, controller 7 integrates the speed command based on the point-of-origin information, and sends the integrated value as commanded-position information to safety unit 9. The speed command is calculated based, for example, on the reduction gear ratios and the point-of-origin information of the robot "A".

Servo driver 10 generates a current value for driving motors 4, based on the speed command from controller 7 and the output signal from encoder 5. Servo driver 10 controls motors 4 based on the current value, thereby controlling the movement of the robot "A".

Safety unit 9 is directly connected to encoders 5 and controller 7. Safety unit 9 determines the presence or absence of a failure in encoders 5 based on the detected-position information of motors 4 calculated based on the output signal from encoders 5, and the commanded-position information from controller 7. As mentioned above, to ensure functional safety of the robot "A", safety unit 9 and controller 7 operate independent of each other. Therefore, the operation applied to controller 7 does not directly affect safety unit 9 and vice versa.

Figure 3:
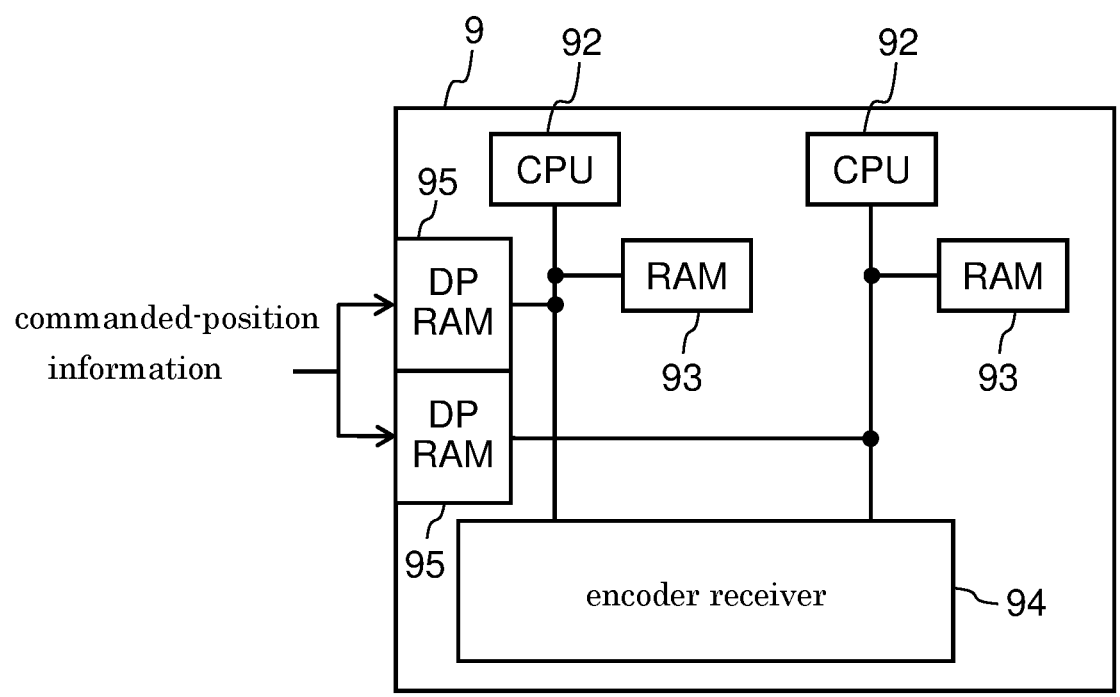
FIG. 3 is a block diagram of a structure of the safety unit.

FIG. 3 is a block diagram of a structure of safety unit 9.

As shown in FIG. 3, safety unit 9 includes CPUs 92 as determination units, RAMs 93, encoder receiver 94 as a first receiver, and dual-port RAM (DPRAMs) 95 as second receivers.

Encoder receiver 94 is connected to encoders 5 and receives their output signal.

DPRAMs 95, which are connected to controller 7 of robot control unit 2, receive the commanded-position information from controller 7. This information is found by integrating the speed command sent from controller 7 to servo driver 10. The commanded-position information received by DPRAMs 95 is stored into RAMs 93.

CPUs 92 receive the output signal from encoder receiver 94, and calculate detected-position information concerning the present position of motors 4 by using the output signal, the reduction gear ratios and point-of-origin information of the robot "A". CPUs 92 then compare the commanded position based on the commanded-position information and the detected position based on the detected-position information so as to determine the presence or absence of a fault in encoders 5.

As shown in FIG. 3, safety unit 9 includes two identical sets of CPUs 92, RAMs 93 and DPRAMs 95. This enables parallel processing using two CPUs 92, so that the fault detection can be double checked to improve reliability.

Figures 4A, 4B:
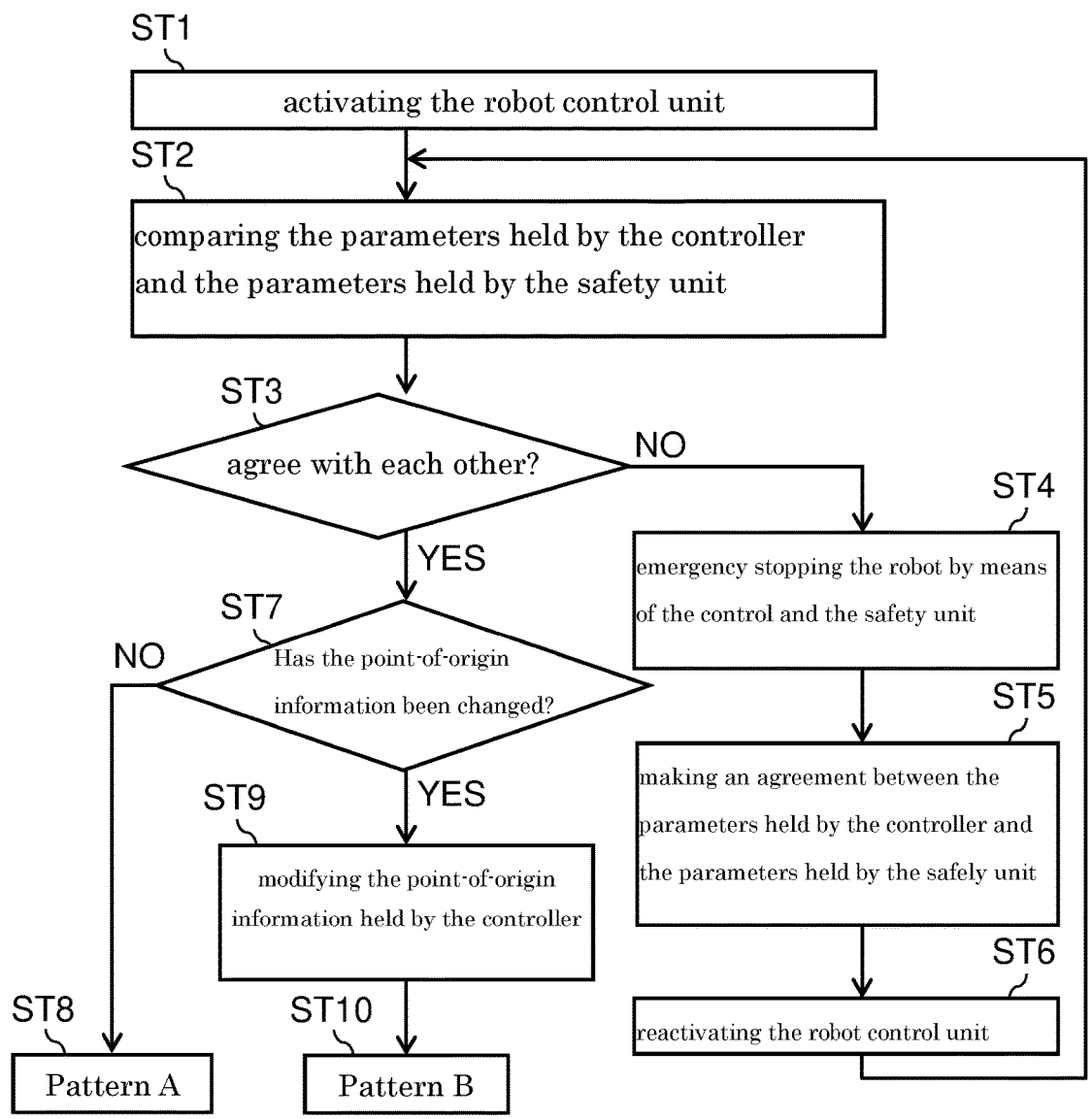
FIG. 4A is a flowchart showing a procedure for the controller to check the parameters and to switch the control patterns.
FIG. 4B shows the correspondence between the control patterns and the point-of-origin information according to the present disclosure.

The Procedure of Checking the Parameters and Transmitting the Commanded-Position Information Performed by the Controller FIG. 4A shows a flowchart showing how the controller checks the parameters and transmits the commanded-position information according to the present exemplary embodiment.

Robot control unit 2 is powered and activated (Step ST1). In Step ST1, safety circuit 6, controller 7, RAM 8, safety unit 9 and servo driver 10 are activated.

Next, controller 7 makes a comparison between the parameters held by controller 7 to control motors 4, more specifically, the parameters stored in RAM 8 and the parameters held by safety unit 9 for fault diagnosis of encoders 5, more specifically, the parameters stored in RAMs 93. To be more specific, controller 7 compares the parameters of the same items of the parameters held in RAMs 8 and 93 (Step ST2). When the parameters of RAMs 8 and 93 are different from each other (NO in Step ST3), both controller 7 and safety unit 9 stop the robot "A" (Step ST4). In robot control unit 2, a mode dedicated to redefine the parameters is chosen and an agreement is made between the parameters held by controller 7 and the parameters held by safety unit 9 (Step ST5). Next, robot control unit 2 is reactivated (Step ST6), and the process goes back to Step ST2 to compare the parameters of RAMs 8 and 93. The agreement between the parameters held by controller 7 and the parameters held by safety unit 9 is checked generally at the start-up of robot control unit 2. In Step ST4, safety unit 9 determines the presence of a fault in the parameters, so that the fault diagnosis of encoders 5 is not performed.

Meanwhile, when the parameters held in RAMs 8 and 93 agree with each other (YES in Step ST3), it is determined whether the point-of-origin information has been modified (Step ST7). If the point-of-origin information has not been modified (NO in Step ST7), controller 7 sends the commanded-position information to safety unit 9 according to Pattern A, which will be described later (Step ST8).

If the point-of-origin information has been modified (YES in Step ST7), the point-of-origin information held by controller 7 is modified, or in other words, is rewritten into new point-of-origin information. More specifically, the point-of-origin information stored in RAM 8 is rewritten into new point-of-origin information (Step ST9). However, controller 7 keeps the original point-of-origin information. During the modification of the point-of-origin information, controller 7 places the robot "A" in the stopped state, whereas safety unit 9 continues the fault diagnosis in encoders 5.

Next, controller 7 sends the commanded-position information to safety unit 9 according to Pattern B, which will be described later (Step ST10).

As shown in FIG. 4B, in Pattern A where the point-of-origin information has not been modified by controller 7, both the point-of-origin information held by controller 7 and the point-of-origin information held by safety unit 9 remain the original values observed when robot control unit 2 is powered on. Consequently, in Pattern A, the commanded-position information is generated based on the original point-of-origin information and sent to safety unit 9.

Meanwhile, in Pattern B where the point-of-origin information has been modified by controller 7, the point-of-origin information held by controller 7 is the new point-of-origin information obtained by modification, whereas the point-of-origin information held by safety unit 9 remains the original value. This is because, as mentioned earlier, modifications to controller 7 do not generally affect safety unit 9. Therefore, in such cases, if controller 7 generates the commanded-position information based on the new point-of-origin information as in the related art (FIG. 4C), there is a large difference between the commanded-position information and the detected-position information of encoders 5 obtained based on the original point-of-origin information. This may cause safety unit 9 to erroneously determine the presence of a fault in encoders 5 in spite of not being faulty.

To prevent this happening, in Pattern B of the present disclosure shown in FIG. 4B, the original point-of-origin information is used as the basic information to generate the commanded-position information. Controller 7 sends to safety unit 9 the commanded-position information based on the original point-of-origin information. This equalizes the point-of-origin information of the commanded-position information and the point-of-origin information held by safety unit 9, thereby preventing fault misdetection in encoders 5.

Method for Detecting a Fault in the Encoders

Figure 5:
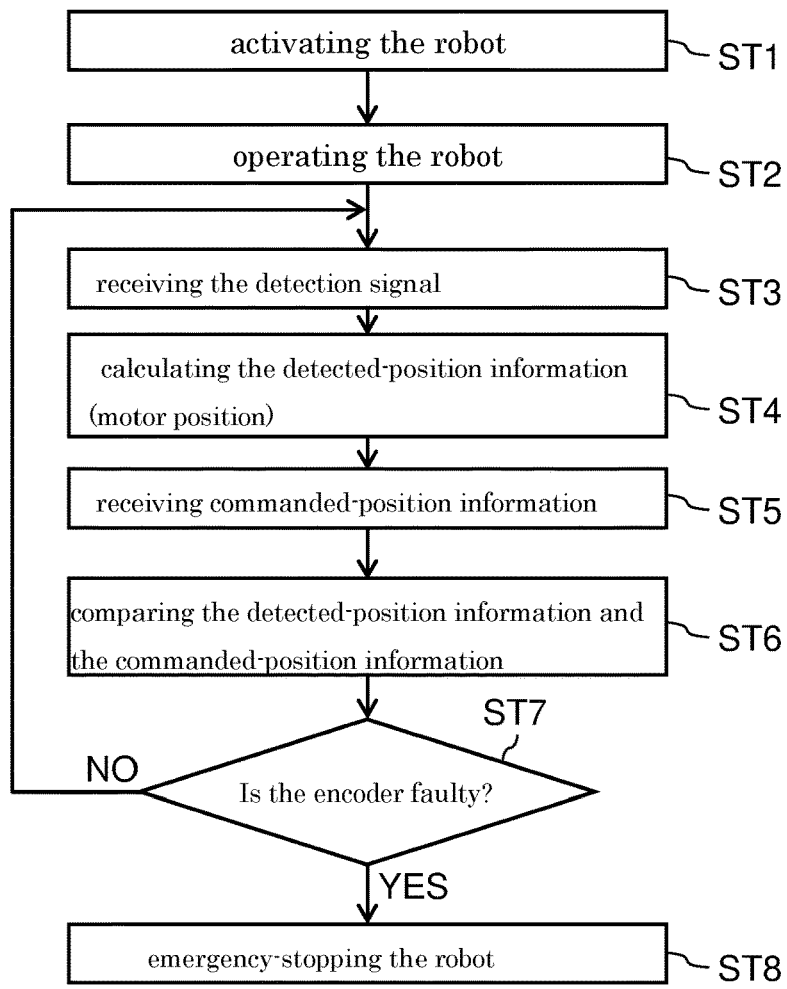
FIG. 5 is a flowchart showing a method for determining the presence or absence of a fault in an encoder according to the first exemplary embodiment.

FIG. 5 is a flowchart showing how safety unit 9 monitors the presence or absence of a fault in encoders 5 after robot control unit 2 activates the robot "A". More specifically, FIG. 5 shows how safety unit 9 monitors the presence or absence of a fault in encoders 5 when controller 7 makes servo driver 10 start to rotate motors 4.

In Step ST1, controller 7 of robot control unit 2 activates the robot "A", and the process proceeds to Step ST2.

In Step ST2, robot control unit 2 operates the robot "A" based on the teaching program, the functional setting, the point-of-origin information of the robot "A" and other information that are set by the operator using operation unit 3. More specifically, servo driver 10 drives motors 4 based on the speed command received from controller 7 so as to operate joint shafts 12 and the external shafts of the robot "A". Servo driver 10 receives the output signal from encoders 5 attached to motors 4 and performs feedback control of motors 4 based on the difference between the speed command and the output signal. At this moment, the output signal from encoders 5 is also sent to safety unit 9.

Upon receiving the output signal from encoders 5 (Step ST3), safety unit 9 calculates the position of the motors (Step ST4). More specifically, CPUs 92 of safety unit 9 converts the output signal into the rotational position (present position) of motors 4 based on the output signal from encoders 5, the reduction gear ratios of the shafts of motors 4, the point-of-origin information and other information of motors 4 held by safety unit 9. The output signal from encoders 5 is sent as a pulse signal.

Furthermore, safety unit 9 receives the commanded-position information from controller 7 (Step ST5) and compares the detected-position information concerning the present position of motors 4 calculated in ST4 and the commanded-position information from controller 7 (Step ST6). More specifically, CPUs 92 of safety unit 9 compare the rotational position of motors 4 calculated based on the output signal from encoders 5 (motor detection value), and the rotational position of the motor (motor command value) received from controller 7. In Step ST5, controller 7 sends the commanded-position information to safety unit 9 in accordance with Pattern A or B shown in FIG. 4B.

When the comparison result indicates that the difference between the motor command value and the motor detection value is not less than the predetermined value (YES in ST7), CPUs 92 determine that there is a fault in encoders 5, and the process proceeds to Step ST8. Meanwhile, when the difference between these values is less than the predetermined value (NO in Step ST7), CPUs 92 do not determine that there is a fault in encoders 5, and the process returns to Step ST3.

More specifically, in the drive control of the robot "A", motors 4 are moving to the position expected by controller 7. Therefore, the difference between the motor detection value indicating the rotational position of motors 4 (detected-position information) and the motor command value indicating the rotational position commanded by controller 7 (commanded-position information) should be within a predetermined threshold Pth. Hence, safety unit 9 determines that there is a fault in the encoders when the rotational position of the motors based on the motor detection value is determined to be away from the motor command position based on the motor command value by not less than the predetermined value.

In Step ST7, CPUs 92 of safety unit 9 send safety circuit 6 an emergency stop signal. Upon receiving this signal, safety circuit 6 stops the driving power supply of the robot "A" so as to emergency-stop the robot "A".

Thus, after controller 7 activates the robot "A", safety unit 9 repeats Steps ST3 to ST7 so as to determine whether there is a fault in encoders 5.

As described above, according to the present exemplary embodiment, safety unit 9 determines whether there is a fault in encoders 5 based on the comparison result between the position information directly received from controller 7 and the position information calculated based on the output signal from encoders 5. This enables the determination of the presence or absence of a fault in the encoders by adding safety unit 9 to the operating device such as a general-purpose robot not having a fault detection unit for the encoders. This can further reduce the influence on the existing system because there is no need to redesign the components of the existing general-purpose robot such as servo driver 10. Hence, the addition of safety unit 9 is applicable to operating devices and systems using general encoders. Furthermore, there is no need to inform the existing system that a process concerning fault determination of the encoders is being performed properly, thereby preventing complications of the processes. This point will be described in comparison to the related art shown in FIG. 14.

Figure 14:
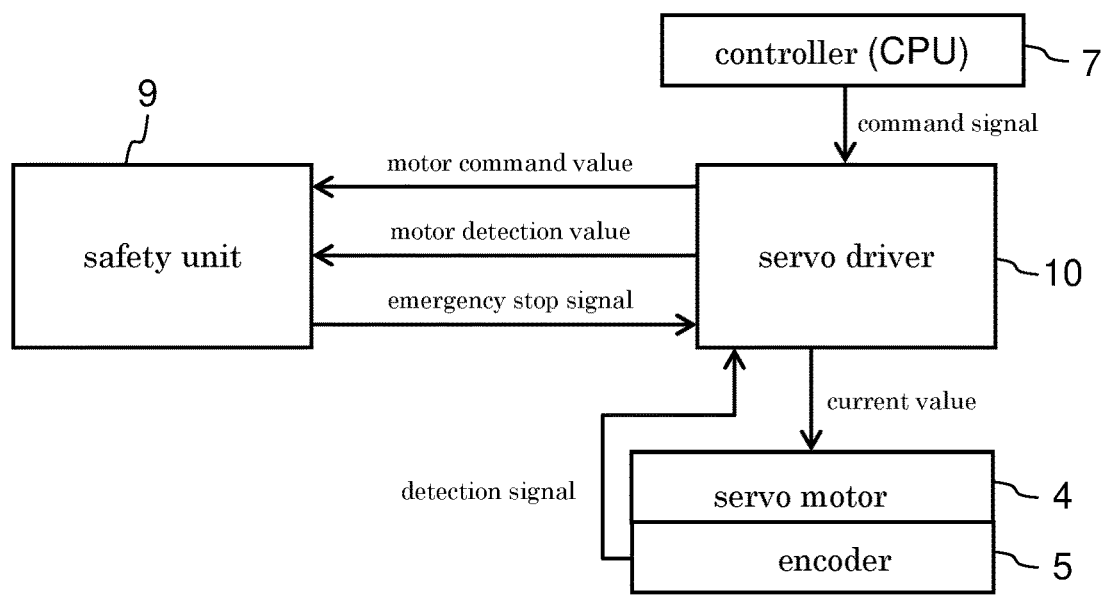
FIG. 14 is a block diagram of the structure of the robot control unit according to the related art.

Assume that the structure shown in FIG. 14 is applied to a general-purpose robot not having a fault detection unit for encoders 5. Servo driver 10 of the general-purpose robot usually does not have the function of generating the motor command value and the motor detection value or the function of outputting the generated motor command value and motor detection value. Therefore, it is necessary to newly design a circuit or program having the above-mentioned functions. It is also necessary to provide a system (e.g., circuit, program, display) that shows whether the newly designed circuit or program is working properly. This takes time and complicates the process. On the other hand, the method for detecting a fault according to the present disclosure does not cause such problems.

As described above, according to the present exemplary embodiment, when the point-of-origin information of motors 4 has been modified, controller 7 sends commanded-position information generated based on the original point-of-origin information to safety unit 9. This can prevent safety unit 9 from erroneously detecting a fault in encoders 5 and maintain the accuracy of fault detection in encoder 5.

As described hereinbefore, according to the method for detecting a fault in the encoders of the present disclosure, when the point-of-origin information is modified and held as new point-of-origin information by the controller, and the original point-of-origin information is held by the fault detection unit, the fault detection unit is unlikely to erroneously detect a fault in the encoders. Furthermore, in the case of using a general-purpose encoder, the presence or absence of a fault in the encoders can be detected with minimum influence on the existing functions and existing devices.

As described above, the first exemplary embodiment has been described as one example of the technique disclosed in the present application; however, the technique of the present disclosure is not limited to this and is subject to modification, replacement, addition, or elimination.

The first exemplary embodiment may alternatively have the following structures.

Modified Example (1)

Figure 6:
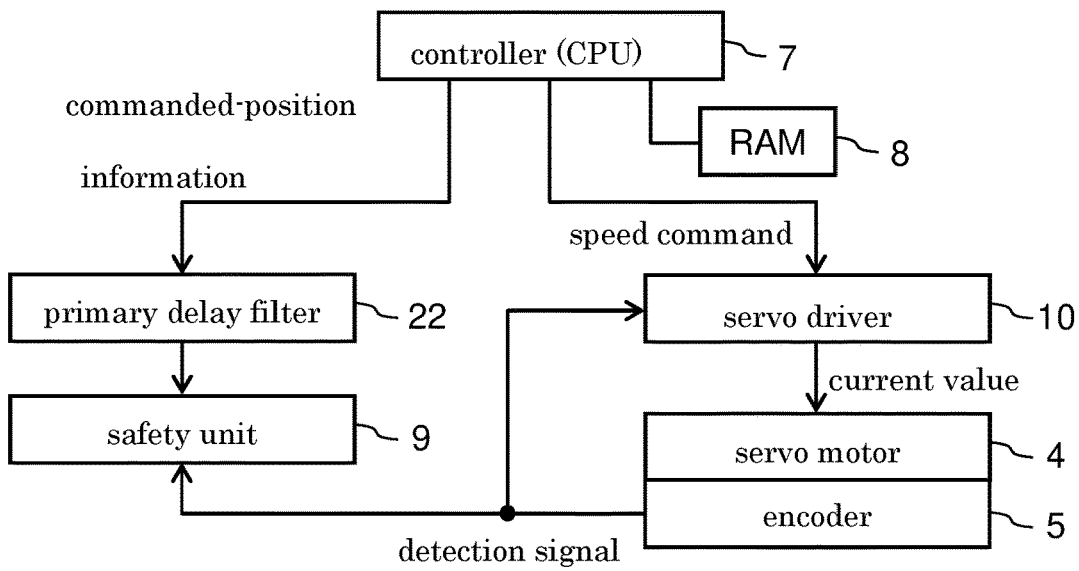
FIG. 6 is a block diagram of another structure of the robot control unit.

FIG. 6 is a block diagram of the structure of the robot control unit according to Modified Example (1).

The structure shown in FIG. 6 is a combination of the structure of FIG. 2 and primary delay filter 22 disposed between controller 7 and safety unit 9. Primary delay filter 22 is a delay control filter for controlling a general control delay.

In the actual control of the robot "A", a comparison may indicate that there may be a displacement between the rotational position of any of motors 4 (motor command position) based on the commanded-position information that safety unit 9 received from controller 7, and the rotational position of the any of motors 4 (motor detection position) based on the output signal that safety unit 9 received from encoders 5. This displacement is due, for example, to the properties of motor control. More specifically, the displacement is due to a fixed delay caused as follows. Controller 7 of robot control unit 2 outputs the speed command and the commanded-position information first. After that, servo driver 10 actually control motors 4, which operate based on the control.

Figure 7:
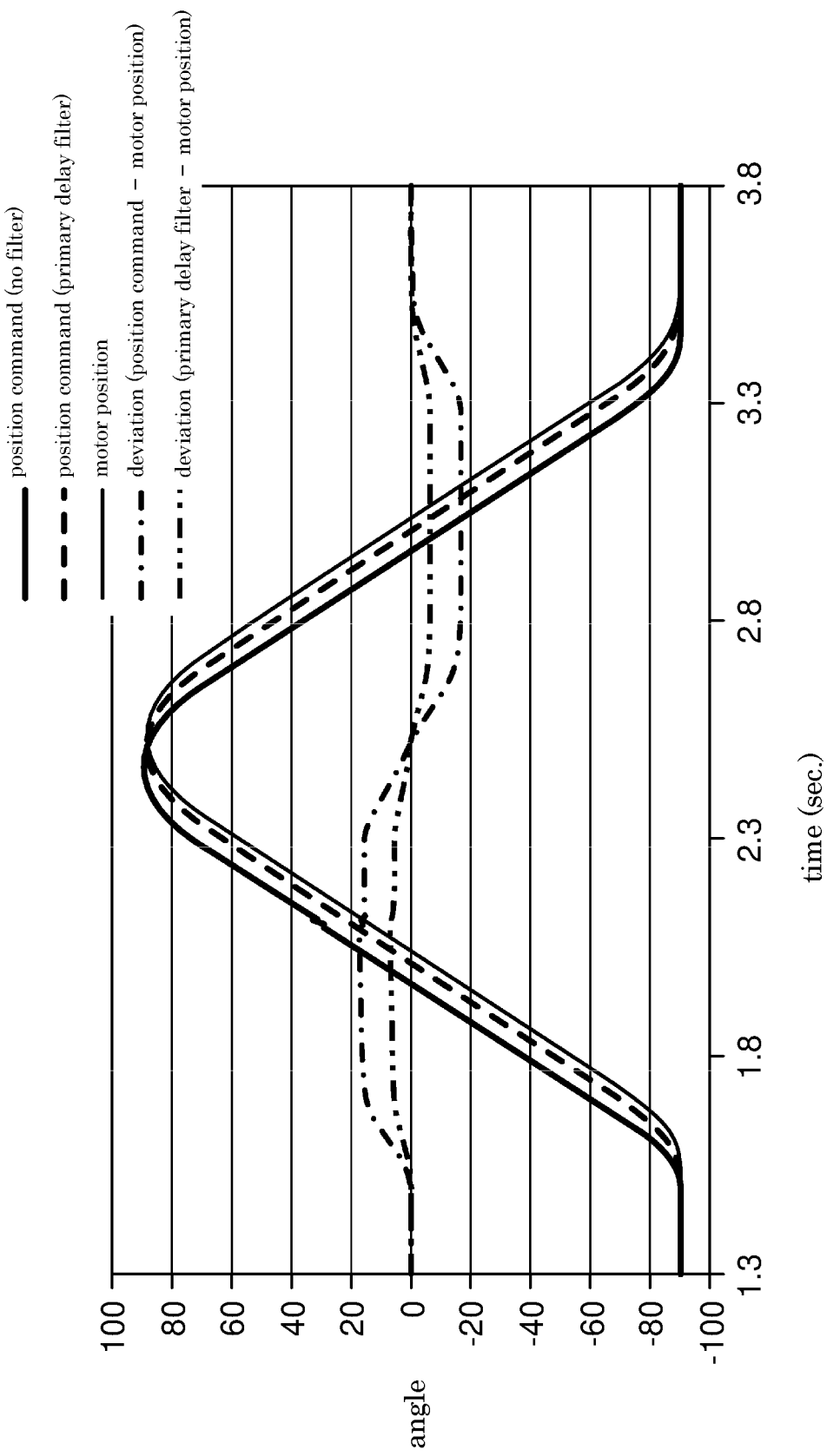
FIG. 7 is a graph showing the relationship between the motor command position and the motor detection position.

FIG. 7 is a graph showing the relationship between the motor command position (the thick solid line in FIG. 7), and the motor detection position (the thin solid line in FIG. 7) when joint shafts 12 of robot arms 11 are reciprocated at maximum speed. A comparison between the thick solid line and the thin solid line in FIG. 7 shows that there is a maximum delay of about 0.1 seconds, which corresponds to a delay of about 18 degrees in terms of angle (see the one-dot chain line in FIG. 7).

Meanwhile, as shown by the broken line and the two-dot chain line shown in FIG. 7, the provision of primary delay filter 22 has greatly reduced the difference between the motor command position and the motor detection position. In FIG. 7, the broken line represents the motor command position in the structure shown in FIG. 6 whereas the two-dot chain line represents the deviation between the motor command position and the motor detection position in the structure shown in FIG. 6.

The structure shown in FIG. 6 achieves the fault determination of the encoders with higher accuracy than the structure shown in FIG. 2. More specifically, for example, the threshold Pth used for the comparison between the detected-position information and the commanded-position information may be determined based on the difference between the motor command position and the motor detection position. In this case, a decrease in the difference between these positions reduces the threshold Pth, thereby improving the accuracy of the fault determination of the encoders.

Note that the method for detecting a fault in encoders 5 according to Modified Example (1) is not described in detail because it is the same as the procedure shown in FIG. 5.

Modified Example (2)

Figure 8:
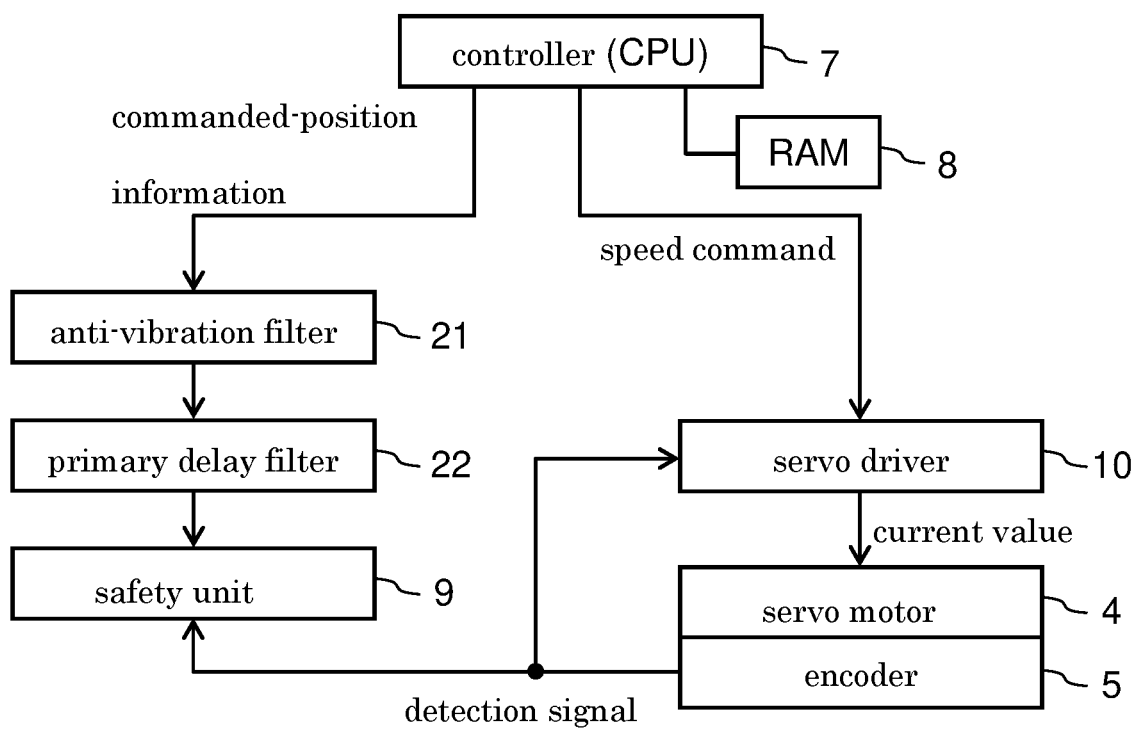
FIG. 8 is a block diagram of another structure of the robot control unit.

FIG. 8 is a block diagram of the structure of the robot control unit of Modified Example (2).

The structure of FIG. 8 is a combination of the structure of FIG. 7 and anti-vibration filter 21, which is disposed between controller 7 and safety unit 9 and is connected in series with primary delay filter 22.

In the actual control of the robot "A", control with high responsivity (hereinafter, high response control) may be performed depending on the contents of the operation control of servo driver 10. One such example is where control at high speed and high trackability is performed in a welding robot using a laser. In such a high response control, motors 4 may be vibrated by the excitation components contained in the commanded-position information. The vibration of motors 4 is usually reduced by providing an anti-vibration filter (not shown) between servo driver 10 and motors 4. Hence, combining the structure shown in FIG. 8 with the high response control enables the generation of a command similar to the control exerted by servo driver 10.

Figure 9:
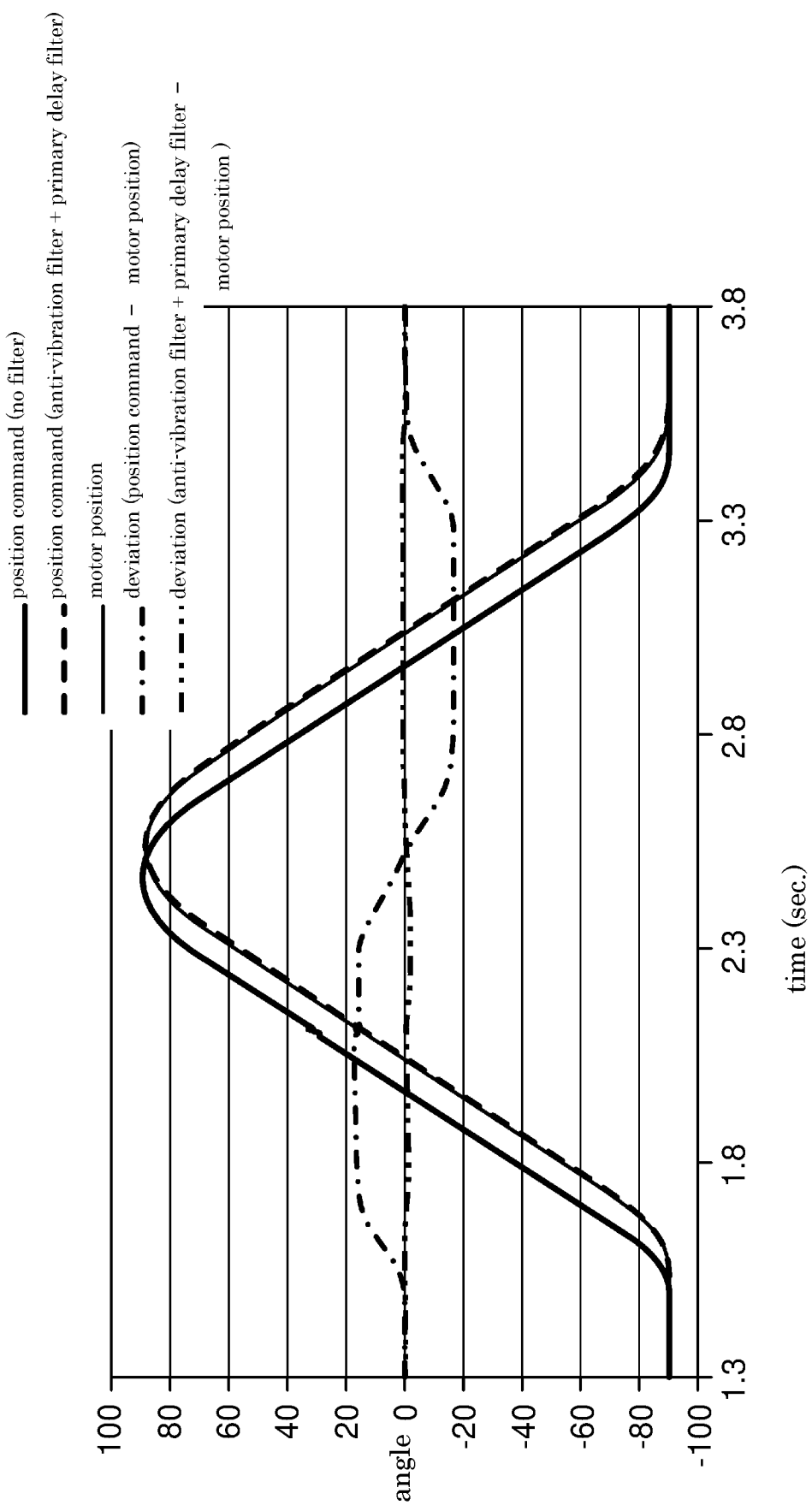
FIG. 9 is a graph showing the relationship between the motor command position and the motor detection position.

FIG. 9 is a graph showing the relationship between the motor command position and the motor detection position when joint shafts 12 of robot arms 11 are reciprocated at maximum speed. The thick solid line and the thin solid line are the same as their equivalents in FIG. 7 and indicate the operation performed in the structure (see FIG. 2) not using primary delay filter 22 or anti-vibration filter 21. In FIG. 9, the broken line represents changes in the motor command position in the structure shown in FIG. 8, and the two-dot chain line represents the deviation between the motor command position and the motor detection position in the structure shown in FIG. 8. The graph in FIG. 9 indicates that providing anti-vibration filter 21 in addition to primary delay filter 22 further reduces the difference between the motor command position and the motor detection position.

Thus, the structure shown in FIG. 8 can perform fault determination of the encoders more accurately than the structures shown in FIGS. 2 and 6. More specifically, similar to Modified Example (1), the structure shown in FIG. 8 can reduce the threshold Pth, thereby increasing the accuracy of the fault determination of the encoders. Anti-vibration filter 21 is used to remove resonant components from the received commanded-position information. Anti-vibration filter 21 and primary delay filter 22 may be provided directly in any order, or only one of them may be provided.

In FIG. 8, filters 21 and 22 may be replaced by each other without a decrease in the effects.

Modified Example (3)

Figure 10:
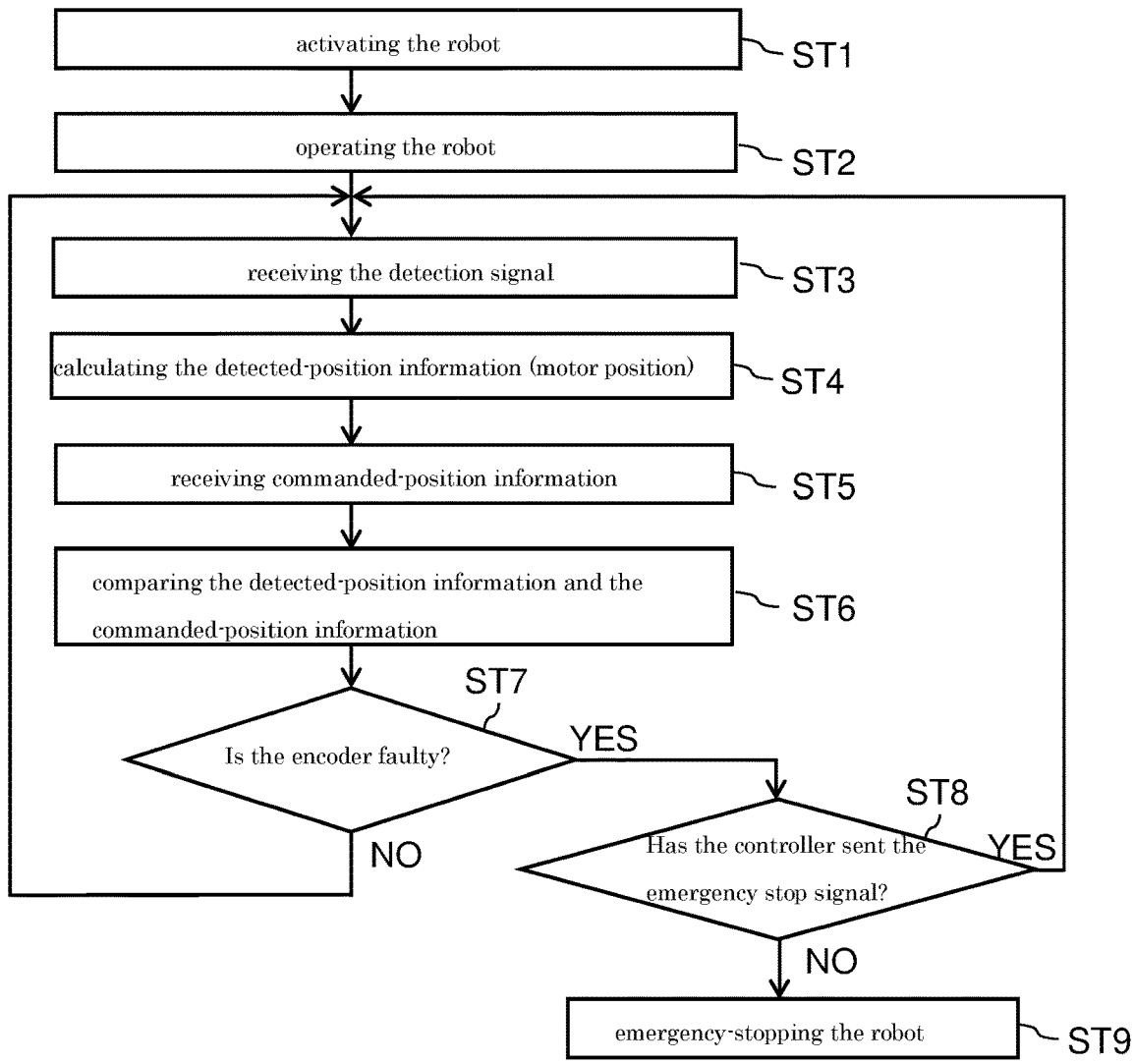
FIG. 10 is a flowchart showing another example of the method for determining the presence or absence of a fault in an encoder according to the first exemplary embodiment.

The method for determining the presence or absence of a fault shown in FIG. 5 may alternatively be performed according to the flowchart shown in FIG. 10. In FIG. 10, Steps ST1 to ST6 are identical to their equivalents in FIG. 5 so that their detailed description will not be repeated here.

In FIG. 10, when the difference between the motor command value and the motor detection value is not less than the predetermined value (YES in Step ST7), the process proceeds to Step ST8. In Step ST9, CPUs 92 of safety unit 9 determine whether controller 7 has ordered the emergency-stop of the robot "A".

More specifically, when emergency-stopping the robot "A", controller 7 sends safety circuit 6 an emergency stop signal (not shown). Upon receiving this signal, safety circuit 6 stops the driving power supply of the robot "A" so as to stop the robot "A". In Modified Example (3), safety unit 9 receives the emergency stop signal from controller 7, and determines in Step ST8 whether controller 7 has outputted the emergency stop signal. When controller 7 has outputted the signal (YES in Step ST8), the process returns to Step ST3. Thus, even when the difference between the motor command value and the motor detection value is not less than the predetermined value, safety unit 9 does not determine that there is a fault in encoders 5.

Meanwhile, when controller 7 has not outputted the emergency stop signal (NO in Step ST8), the process proceeds to Step ST9. In Step ST9, CPUs 92 of safety unit 9 send safety circuit 6 the emergency stop signal. Upon receiving the signal, safety circuit 6 emergency-stops the robot "A".

Performing Step ST8 after Step ST7 eliminates the possibility of safety unit 9 erroneously determining that there is a fault in encoders 5 when the robot "A" is emergency-stopped by the command of controller 7. More specifically, if controller 7 stops the robot "A" by outputting the emergency stop signal, controller 7 is prevented from outputting the commanded-position information. Therefore, if safety unit 9 continues to compare the motor command value and the motor detection value, encoders 5 may be determined to be faulty although they are operating properly. However, performing the process according to the Modified Example (3) can prevent the occurrence of such problems.

The steps in the flowcharts shown in FIGS. 5 and 10 do not necessarily have to be processed in the order shown in the flowcharts; the steps may be rearranged, or processed in different orders or by different methods if some of the steps can be parallel-processed. For example, the processes of Steps ST3 and ST4 may be parallel-processed with the process of Step ST5.

Second Exemplary Embodiment

The present exemplary embodiment will describe a method for detecting a fault in the encoders when the robot "A" operates in succession.

The basic structure and operation when the robot "A" operates in succession are identical to their equivalents in the first exemplary embodiment. Therefore, the description of the present exemplary embodiment will be focused on the robot "A" successive operation.

Figure 11:
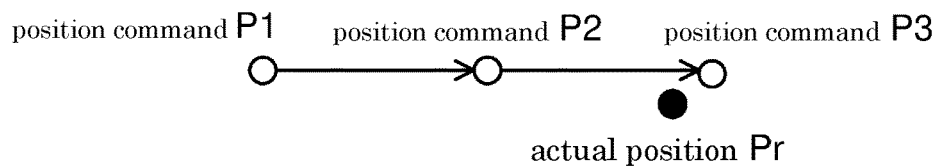
FIG. 11 shows the relationship between the motor command position and the actual position when the joint shafts proceed as described in the second exemplary embodiment.

FIG. 11 shows the relationship between the motor command positions P1 to P3 and the actual motor position Pr (hereinafter, present position Pr) in the case that joint shafts 12 make a progressive movement in such a manner that the motor command position is moved from P1 to P2, and then from P2 to P3 based on the speed command from controller 7. In the progressive movement shown in FIG. 11, when the motor command position is moved to the position P3, the present position Pr is near P3. Therefore, fault detection of encoders 5 can be performed according to the flowchart shown in FIG. 5 or 10.

Figure 12:
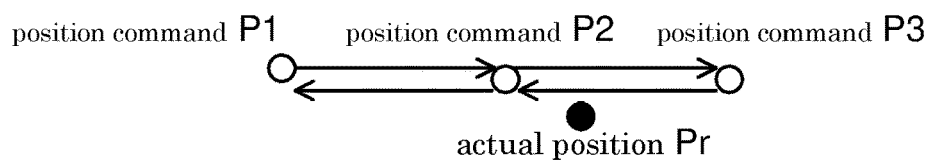
FIG. 12 shows the relationship between the motor command position and the actual position when the joint shafts reciprocate as described in the second exemplary embodiment.

Meanwhile, as shown in FIG. 12, when joint shafts 12 reciprocate in such a manner that the motor command position based on the speed command from controller 7 moves from P1 to P3 via P2 and returns from P3 to P1 via P2, safety unit 9 may erroneously determine that there is a fault in encoders 5. For example, when the reciprocation shown in FIG. 12 is performed at high speed, servo driver 10 may allow motors 4 to make a return, making the present position Pr return from P2 to P1 before the position Pr reaches or closely approaches P3. Assume, in such a case, that safety unit 9 compares the motor command position based on the commanded-position information P3 and the motor detection position based on the present position Pr of motor 4. In this case, safety unit 9 may erroneously determine that there is a fault in encoders 5 due to the large difference between the positions P3 and Pr although encoders 5 are properly operating.

Figure 13:
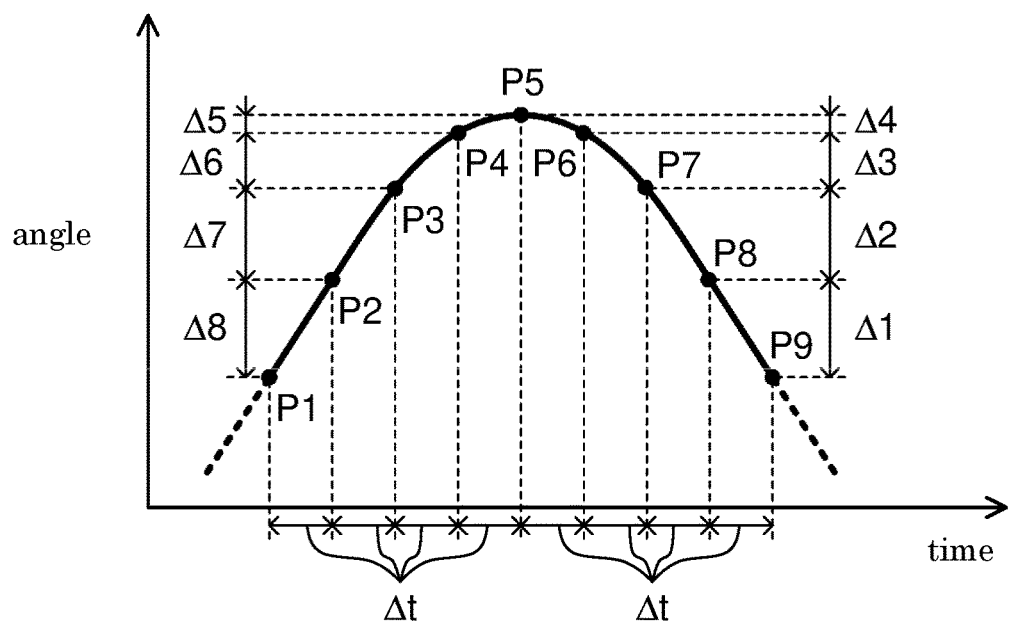
FIG. 13 is a graph showing the relationship between the motor command position and the motor detection position.

To prevent this happening, in Step ST5 shown in FIGS. 5 and 10, CPUs 92 integrate the amount of change Δn of the motor command value based on the commanded-position information (the amount of difference Δn between the commanded position and the immediately preceding commanded position) n times (e.g., five times). More specifically, for example, when joint shafts 12 are reciprocated from point P1 to point P9 as shown in the solid line in FIG. 13, the amount of change Δn is integrated five times of Δ1 to Δ5. In other words, the integrated value Δ is equal to the total of Δ1+Δ2+Δ3+Δ4+Δ5. FIG. 13 is a graph showing the motor command position when joint shafts 12 of robot arms 11 are reciprocated.

In Step ST6, CPUs 92 compare the value obtained by adding or subtracting the integrated value Δ to or from the motor command value and the motor detection value calculated based on the detected-position information. In Step ST7, the presence or absence of a fault in the encoders is determined based on the comparison result. More specifically, when the motor detection value P(fs) satisfies Mathematical Formula 1 shown below, encoders 5 are not determined to be faulty. In this case, the amount of change Δn is integrated in absolute value regardless of the direction of change. The amount of change Δn varies in proportion to the speed of the motors. In short, when the motors are driven at high speed, the amount of change Δn has a large value whereas when the motors are driven at low speed, the amount of change Δn has a small value.

$$Pn-\Delta \leq P(fs) \leq Pn+\Delta$$

$$(\Delta = \Delta1+\Delta2+\Delta3+\Delta4+\Delta5+\ldots+\Delta n) \quad \text{Mathematical Formula 1}$$

Thus, when the robot performs a specific operation such as reciprocation, CPUs 92 can be prevented from determining that there is a fault in encoders 5 in spite that encoders 5 are operating properly.

According to the above-described method for detecting a fault in encoders 5, the integrated value Δ may be zero while the robot "A" is not working for a certain period due, for example, to an emergency-stop. To avoid this happening, in Step ST5, Mathematical Formula 1 may be replaced by Mathematical Formula 2 shown below, where a predetermined threshold Th is added to the integrated value Δ.

$$Pn-\Delta \leq P(fs) \leq Pn+\Delta$$

$$(\Delta = \Delta1+\Delta2+\Delta3+\Delta4+\Delta5+\ldots+\Delta n+Th) \quad \text{Mathematical Formula 2}$$

There are cases where the commanded-position information from controller 7 is not modified for a predetermined period of time, or in other words, controller 7 orders the robot "A" not to move for a predetermined period of time. In such a case, the provision of the threshold Th enables safety unit 9 to detect a fault even while the robot is performing an operation not intended by the control device, thereby emergency-stopping the motion of the robot "A".

INDUSTRIAL APPLICABILITY

The method for detecting a fault in the encoders according to the present disclosure can prevent fault misdetection in the encoders, which is likely to occur when the point-of-origin information of the motors has been modified. Therefore, this method is useful for general-purpose industrial robots such as welding robots and other operating devices.

REFERENCE MARKS IN THE DRAWINGS

A robot (operating device)
4 motor
5 encoder
6 safety circuit
7 controller
8, 93 RAM (storage)
9 safety unit (fault detection unit)
10 servo driver (driver)
12 joint shaft (output shaft)
21 anti-vibration filter
22 primary delay filter (delay control filter)
92 CPU (determination unit)
94 encoder receiver (first receiver)
95 DPRAM (second receiver)

The invention claimed is:

1. A method for detecting a fault in an encoder, the encoder being configured to detect a rotational position of a motor, the motor being configured to drive an output shaft of an operating device, the operating device including:
   a fault detection unit configured to detect the fault in the encoder;
   a controller configured
      to output a speed command indicating the rotational position of the motor and to send to the fault detection unit commanded-position information indicating the rotational position of the motor according to the speed command; and a driver configured
   to receive the speed command from the controller and an output signal from the encoder and
   to control driving of the motor based on the speed command and the output signal, the method comprising:

an information transmission step of causing the controller to send to the fault detection unit the commanded-position information, the commanded-position information being compensated for a time delay due to a delay in drive control of the motor;

an information acquisition step of causing the fault detection unit to receive the commanded-position information from the controller and the output signal from the encoder; and a fault determination step of causing the fault detection unit
   to compare the commanded-position information compensated for the time delay and detected-position information of the motor calculated based on the output signal and
   to determine that the encoder is faulty when there is a difference of not less than a predetermined value between the commanded-position information compensated for the time delay and the output signal, wherein in the fault determination step, a presence or absence of the fault in the encoder determined by the fault detection unit is based on a comparison result between the detected-position information and a sum of the commanded-position information and an integrated value of an amount of change of the commanded-position information.

2. The method according to claim 1, wherein
in the information transmission step, the commanded-position information sent from the controller to the fault detection unit does not contain a resonant component, and
in the fault determination step, a presence or absence of the fault in the encoder determined by the fault detection unit is based on a comparison result between the detected-position information and the commanded-position information from which the resonant component has been removed.

3. The method according to claim 1, wherein
in the information transmission step, when the controller is holding modified point-of-origin information of the motor and the fault detection unit is holding original point-of-origin information of the motor, the commanded-position information sent from the controller to the fault detection unit is based on the original point-of-origin information, and
in the fault determination step, a presence or absence of the fault in the encoder determined by the fault detection unit is based on the comparison result between the detected-position information and the commanded-position information generated based on the original point-of-origin information.

4. The method according to claim 1, wherein in the fault determination step, the presence or absence of the fault in the encoder determined by the fault detection unit is based on a comparison result between the detected-position information and a value obtained by adding a predetermined threshold to the sum of the integrated value and the commanded-position information.

5. The method according to claim 1, wherein
the operating device further includes a safety circuit configured to emergency-stop the operating device,
the controller is configured to send the safety circuit an emergency stop signal in case of an emergency, and
in the fault determination step, when detecting the emergency stop signal sent from the controller, the fault detection unit does not determine that the encoder is faulty even if the difference between the commanded-position information and the output signal is not less than the predetermined value.

6. The method according to claim 1, wherein the operating device is a robot.

7. A method for detecting a fault in an encoder, the encoder being configured to detect a rotational position of a motor, the motor being configured to drive an output shaft of an operating device, the operating device including:

a fault detection unit configured to detect the fault in the encoder;

a controller configured
   to output a speed command indicating the rotational position of the motor and
   to send to the fault detection unit commanded-position information indicating the rotational position of the motor according to the speed command; and a driver configured
   to receive the speed command from the controller and an output signal from the encoder and
   to control driving of the motor based on the speed command and the output signal, the method comprising:

an information transmission step of causing the controller to send to the fault detection unit the commanded-position information, the commanded-position information being compensated for a time delay due to a delay in drive control of the motor;

an information acquisition step of causing the fault detection unit to receive the commanded-position information from the controller and the output signal from the encoder; and a fault determination step of causing the fault detection unit
   to compare the commanded-position information compensated for the time delay and detected-position information of the motor calculated based on the output signal and
   to determine that the encoder is faulty when there is a difference of not less than a predetermined value between the commanded-position information compensated for the time delay and the output signal, wherein
the operating device further includes a safety circuit configured to emergency-stop the operating device,
the controller is configured to send the safety circuit an emergency stop signal in case of an emergency, and
in the fault determination step, when detecting the emergency stop signal sent from the controller, the fault detection unit does not determine that the encoder is faulty even if the difference between the commanded-position information and the output signal is not less than the predetermined value.

* * * * *